United States Patent [19]
White et al.

[11] 3,727,209
[45] Apr. 10, 1973

[54] DIGITAL ACCELEROMETER

[75] Inventors: Marvin H. White, Laurel, Md.;
Richard G. Hamel, Margate, Fla.;
David D. O'Sullivan, Bethesda, Md.

[73] Assignee: Westinghouse Electric Corporation, Pittsburgh, Pa.

[22] Filed: Oct. 13, 1970

[21] Appl. No.: 80,394

[52] U.S. Cl. ............... 340/262, 200/61.49, 307/121
[51] Int. Cl. ....................... G01p 15/04, H01h 35/14
[58] Field of Search ................... 200/61.49, 61.51, 200/61.45, 80, 61.52, 61.53; 340/262; 318/462, 465, 475, 488, 490; 307/121; 73/70.2, 71.2, 517

[56] References Cited

UNITED STATES PATENTS

| | | | |
|---|---|---|---|
| 3,097,272 | 7/1963 | Hautly | 200/61.49 |
| 3,374,663 | 3/1968 | Morris | 73/71.2 |
| 3,448,621 | 6/1969 | Magoa et al. | 73/517 |
| 3,455,148 | 7/1969 | Foster et al. | 73/71.2 |
| 3,524,031 | 8/1970 | Mack | 200/61.53 |
| 3,528,297 | 9/1970 | Lee | 73/517 |
| 3,553,482 | 1/1971 | Tavis | 307/121 |

*Primary Examiner*—Donald J. Yusko
*Attorney*—F. H. Henson, E. P. Klipfel and S. Weinberg

[57] ABSTRACT

A threshold accelerator switch is mounted on an object to indicate when the object is being subjected to a predetermined acceleration. The emitter and base terminals of a transistor are connected across the switch contacts. When the object is subjected to a predetermined acceleration, the switch contacts close causing the base electrode of the transistor to be shorted out, thus turning off the transistor. A plurality of switches and transistors can be mounted on a single object in order to measure the acceleration profile of the object.

The invention herein described was made in the course of or under a contract or subcontract thereunder, with the Department of the Army.

8 Claims, 5 Drawing Figures

PATENTED APR 10 1973 3,727,209

WITNESSES
Theodore F. Wrobel
James F. Young

INVENTORS
Marvin H. White, David D. O'Sullivan
and Richard G. Hamel
BY Stanley Weinberg
ATTORNEY

DIGITAL ACCELEROMETER

CROSS REFERENCES TO RELATED APPLICATIONS

This application is related to copending application Ser.-No. 121,040 filed Mar. 4, 1971 entitled "Electronic Fuse System" by M. H. White, R. G. Hamel, and D. D. O'Sullivan and assigned to the same assignee as the present invention.

BACKGROUND OF THE INVENTION

1. Field of the Invention

In general, the present invention relates to accelerometers. More specifically, it relates to digital accelerometers — that is, accelerometers which indicate whether one predetermined threshold level of acceleration has been exceeded.

2. Description of the Prior Art

One prior art device uses piezoelectric crystals. Two such crystals are placed between a mass and a support base. The entire assembly is then mounted on an object. As the object is subjected to increasing accelerations, the mass will cause increased pressure to be exerted on the crystals. The crystals will generate a changing output voltage which is proportional to the increase or decrease in acceleration.

Another device for sensing changes in acceleration is the piezojunction transducers in the form of pressure sensitive transistors. In this case, as the acceleration increases, pressure is applied to the emitter-base junction of the transistor thereby changing its current gain.

However, many problems result from these devices. First, they require a seismic mass and spring assembly to transduce the accelerational force to the sensor and the entire assembly must be critically mounted on the sensor. Second, because the sensors are analog sensors, they continuously sample the acceleration, thereby requiring power dissipation. Third, they are extremely large and cause weight problems.

BRIEF SUMMARY OF THE INVENTION

The invention includes a switch which is mounted on an object which may be subjected to a particular acceleration. The switch is mounted on a support and is made up of a stationary conductive member and a movable conductive member both of which are disposed on the support means. When the object on which the switch is located is subjected to a predetermined acceleration, the switch contacts close.

Two types of switches are shown. The first switch is a cantilever-type switch. That is, one extremity of the movable conductive member rests on the support base while the other extremity is able to swing free. When the object is stationary, the free end of the cantilever beam is fixed to be a predetermined distance from the stationary conductive member.

In the second embodiment, the movable conductive member takes the form of a beam which is clamped at both ends. Again, a predetermined fixed relation is set up between the movable conductive member and the stationary conductive member. Here, the center of the double-clamped beam is flexible. When the object is subjected to a predetermined acceleration, the center of the beam is flexed toward the stationary conductive member until, when the threshold acceleration is reached, the two beams come into contact with each other. The contacting of one beam with the other beam defines the closing of the switch.

Irrespective of which switch is used, an electronically controllable switching means, in the form of a transistor, is connected to each of the switch contacts. A source of voltage is also connected to the transistor. Before the object is subjected to a predetermined acceleration, the switch contacts are open and the transistor is conducting. When the threshold acceleration is reached, the switch contacts close causing the transistor to become non-conductive and resulting in a high voltage being sensed at the output of the transistor.

The acceleration profile of an object can also be measured by providing a plurality of the above switches and transistors each of which is designed to indicate when a different threshold acceleration level is reached. In each case, the conductivity of each transistor is controlled by a separate switch of either type.

BRIEF DESCRIPTION OF THE DRAWINGS

For a better understanding of the invention, reference may be had to the preferred embodiment, exemplary of the invention, shown in the accompanying drawings, in which.

DETAILED DESCRIPTION OF THE INVENTION

The present invention is a very small, digital solid-state accelerometer which senses threshold acceleration levels and which is compatible with integrated circuitry. "Threshold" means a single, predetermined level of acceleration. Therefore, the accelerometer to be described can only sense a single, predetermined acceleration level.

It is often desirable to know when an object is accelerating at a certain rate or what the acceleration forces are on a particular object in a particular direction. For example, it might be desirable to know the centrifugal acceleration of a rotating machine such as a turbine or a generator. As another example, it might be desirable to know when a projectile, fired by a rifle reaches a particular acceleration. This is an example of setback acceleration. For still another example, it might also be desirable to measure the acceleration forces on an automobile which is involved in an accident. This is an example of impact acceleration. In addition to the above three examples, there are innumerable situations where it might be desirable to measure acceleration forces.

Figure 1:
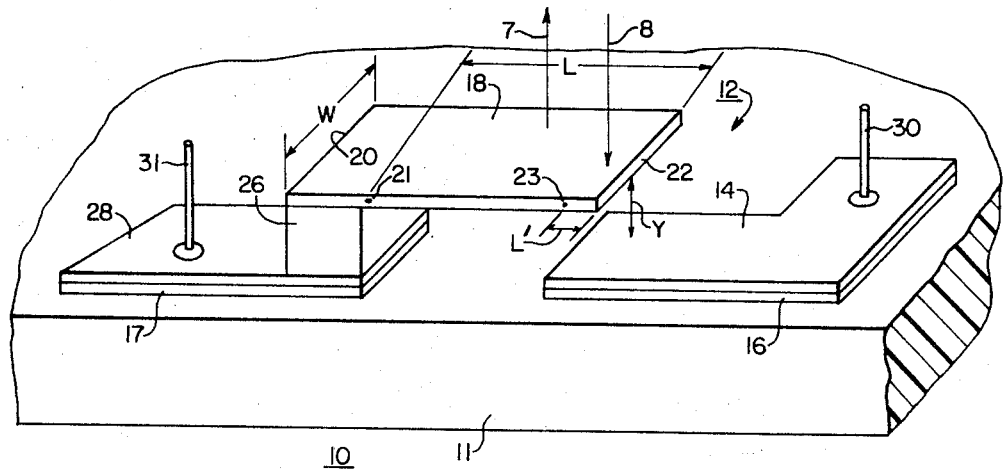
FIG. 1 shows a perspective view of a preferred embodiment of the switch.

FIG. 1 shows a preferred embodiment of the invention. It shows a switch assembly 10 which can easily be mounted on an object (not shown) such as an automobile, an artillary shell, or a lathe. For purposes of illustration, but by no means for limiting this applicability, switch assembly 10 is assumed to be moving in the direction of arrow 7 — that is, straight up. If the velocity of the object on which the switch assembly 10 is mounted increases, the switch assembly and the object will undergo an acceleration in the direction of arrow 7. Following Newton's second law of motion (F = ma) and Newton's third law of motion (for every action there is an equal and opposite reaction), both the object and the switch assembly 10 will be subjected to an acceleration force in the opposite direction to the direction of movement as shown by arrow 8. If the rate of increase of the velocity in the direction of arrow 7 continues to increase, the acceleration will likewise increase resulting in an increase in the acceleration forces being exerted in the direction of arrow 8. The switch assembly 10 is able to indicate when a threshold or predetermined acceleration in the direction of arrow 7 has been reached by responding to the acceleration forces in the direction of arrow 8. Specifically, switch 12 is actuated through deflection of the upper beam 18 towards lower beam 14.

The switch assembly 10 includes a switch 12. The switch 12 includes a first conductive member 14 which forms the lower contact of the switch. Contact 14 is a simple, plane beam which is conductive over its entire length and which is illustrated in FIG. 1 as being stationary. Beam 14 may be constructed out of any conductive material. In a preferred embodiment, it is fabricated out of gold. However, other metals can be used.

Coextensive with and contiguous to beam 14 is a layer of titanium 16. Layer 16 is not limited to fabrication from titanium alone but can be fabricated from any material which provides adhesion to substrate 11 and whose etching properties are such that it can be etched away without affecting the material comprising beam 14. Beam 14 is bonded to layer 16 by intermetallic forces, the details of which are not important to the present invention.

The combination of beam 14 and layer 16 rests on an insulating substrate 11. The insulating substrate is part of a support means and may be fabricated from such materials as glass or aluminum oxide and may be typically in a range of 2 to 20 mils thick (1 mil = 0.001 inch). In addition to allowing for proper etching procedures, the titanium is used to provide adherence of the gold beam 14 to the insulating substrate 11.

Switch 12 also includes an upper contact 18 in the form of a second conductive member. Upper contact 18 is a movable, plane, cantilever beam which is conductive over its entire length. Beam 18 has a first extremity 20 and a second extremity 22. A first portion of the support means for beam 18 includes a conductive spacer 26. Spacer 26 is bonded by intermetallic forces to a portion of beam 18 the boundaries of which are defined by extremity 20 and point 21. Another portion of beam 18, the boundaries of which are defined by extremity 22 and point 23, overlaps beam 14. The portion of beam defined by point 21 and extremity 22 is not supported by any intervening support material. When the object upon which the switch assembly is mounted is at rest, the portion defined by point 21 and extremity 22 is substantially parallel to beam 14. Spacer 26 determines the distance y between the overlapping portion of beam 18 and beam 14. Therefore, when the object is at rest, the relationship between beam 18 and beam 14 is substantially fixed.

Beam 18, like beam 14, is preferably fabricated from gold although other metals are equally usable. In fact, any metal could be used for beams 14 and 18 which is ductile and resilient, which is easily etched so that its thickness can be controlled, which is uniform and has no faults in it, which has a differential etch rate relative to the other metals being used, and whose Young's modulus, E, changes only slightly with changes in temperature. The spacer 26 can be fabricated from nickel or molybdenum or any other material which may be readily etched out under the gold cantilever beam without etching the cantilever itself.

Bonded to the spacer 26 is a metallic conductor 28 which is preferably fabricated from gold. Conductor 28 is the same height from the supporting insulating substrate 11 as the lower beam 14. Spacer 26 is bonded to only a small portion of the conductor 28. Contiguous to and coextensive with the conductor 28 is a layer of titanium 17. The layer of titanium 17, the conductor 28 and the spacer 26 can be said to comprise a first portion of the supporting means for the cantilever beam 18. It is conductive. Insulating substrate 11 can be said to comprise a second portion of the supporting means. It is non-conductive. Together, they comprise the entire supporting means.

A number of factors must be considered in determining the size of the elements which comprise the switch 12. Some of the factors are the length L, of the beam 18 which extends from the spacer 26 beginning at line 21, the spacing y, between the upper beam 18 and the lower beam 14, the resonant frequency of the beam 18, the electrostatic pull-in forces between the bars, and the thickness d, of the upper beam 18.

As is the case with any switch, a voltage is present across the contacts 18 and 14 when the switch is open. Because of the extremely small size of the present switch, overly large voltages across the contacts will present problems. One limitation on the operating voltage is the dielectric breakdown of air which typically lies in the range of 2–3 × $10^6$ V/M (volts/meter). It is desirable to have this breakdown occur when the switch has closed to about 5 percent of its initial separation — i.e., the separation between the upper and lower beams when the object and the switch are at rest. This relationship can be written as:

$$V_{operating}/0.05\ y \leq 2\text{–}3 \times 10^6 \text{ V/M}, \qquad (1)$$

where y is the spacing between the contacts when the object on which the switch is mounted is at rest. Thus, we can see that equation (1) will limit the operating voltage across the contacts to a very small voltage — preferably, less than 1 volt.

Another limitation on the operating voltage is the electrostatic effect which might be caused by too large a voltage being applied across the contacts. If too high a voltage is applied across the contacts, the electrostatic effects will cause the contacts to close prematurely. That is, the contacts will be closed before the threshold acceleration is reached thereby providing an inaccurate indication of acceleration level. In order to minimize the electrostatic effects, the operating voltage should be less than 5 percent of the intrinsic pull-in voltage. Therefore, in order to obtain an indication of a particular threshold acceleration, $$V_{operating} \leq 0.05 V_{pi} \quad (2)$$

The pull-in voltage — $V_{pi}$ of equation (2) is defined as that voltage which will cause the contacts to close prematurely before the desired threshold, acceleration, $a(t)_{threshold}$ is reached. The pull-in voltage is determined by:

$$V_{pi} = \sqrt{\frac{8K}{27\epsilon_0 W L'}\left[y - \frac{\rho W L' d}{K}\frac{a(t) \text{ threshold}}{g}\right]} \quad (3)$$

where $\epsilon_0$ is the dielectric constant of air, $W$ is the width of beam 18, $L'$ is the distance between extremity 22 and line 23 of beam 18 which overlaps lower beam 14, $y$ is the distance between the two beams, $\rho$ is the density of the beam, $d$ is the thickness of the upper beam, $g$ is the acceleration of gravity, and $K$ is the "spring constant" of beam 18 defined by $$K = (3Ed^3 WL')/3L^4 \quad (4)$$

$E$ of the equation (4) is Young's modulus of beam 18.

It will be apparent to those of ordinary skill in the art that the 5 percent criterion used in the discussion of the dielectric breakdown of air and in the discussion of the pull-in voltage can be varied depending upon the conditions under which the acceleration detector is being used.

In determining the length of the beam 18 from line 21 to extremity 22, the resonant frequency of the beam must be taken into consideration. The resonant frequency of the beam is defined by:

$$f_{res} = (0.505\, d)/L^2 \sqrt{E/\rho} \text{ Hz} \quad (5)$$

Once the length and thickness of the beam 18 is determined by using the other factors, it should be redesigned so that the resonant frequency of the beam 18 is several octaves above the highest frequency component of interest in the acceleration profile.

The choice of geometry is also determined by the acceleration threshold. Therefore, in choosing the spacing between the contacts 14 and 18, the following equation must be followed:

$$y = \frac{3\rho L^4}{2Ed^2}\left[1 + \frac{a(t) \text{ threshold}}{g}\right] \text{ meters} \quad (6)$$

$$= \frac{0.384}{f_{res}^2}\left[1 + \frac{a(t) \text{ threshold}}{g}\right]$$

$$\cong \frac{0.384}{f_{res}^2}\left(\frac{a(t) \text{ threshold}}{g}\right) \text{ meters}$$

Therefore, once an approximation has been made as to the length and thickness of the upper contact 18, the spacing between the contacts can be determined by the insertion of the desired value of threshold acceleration into equation (6).

In a practical embodiment, the density of gold would be $2 \times 10^4$ kg/m$^3$ and that Young's modulus would be $E = 8 \times 10^9$ kg/m$^2$.

The dimensions for the switch could, as an example, be as follows: $y = 6$ microns; $d = 6$ microns; $L = 20$ mils; and $W = 1$ mil. This would give a threshold accelerometer detection level of $a_{threshold} \cong 560$ g and a resonant frequency of $f_{res} \cong 6$ kHz.

Connected to contact-conductor 14 and conductor 14 and conductor 28 are terminal wires 30 and 31 respectively. Terminal wires 30 and 31 are connected to conductors 14 and 28 by thermal compression bonding. It is desirable to use the same metal for the terminals as is used in fabricating conductors 14 and 28 in order to minimize galvanic cell action. Therefore, in a preferred embodiment, terminal wires 30 and 31 will be fabricated from gold. An alternate approach is to employ gold beam leads which cantilever over the ends of substrate 11.

Figure 2:
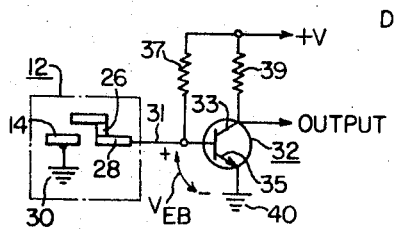
FIG. 2 shows a schematic representation of a preferred circuit using the switch with a transistor.

FIG. 2 shows a circuit which indicates when the switch contacts are open or closed. The indicating circuit includes a transistor 32 which has a collector 33, a base 34, and an emitter 35. Emitter 35 is connected to ground 40, thereby being connected to stationary contact 14 by line 30. Base 34 is connected to movable contact 18 of the switch over elements 26 and 28 and line 31.

A supply voltage, $+V$, is connected to the base 34 by way of resistor 37. As indicated above, the operating voltage, $V_{operating} = V_{EB}$ as shown in FIG. 2 and will be less than 1 volt. The supply voltage $+V$ is also connected to the collector 33 of transistor 32 by way of resistor 39.

In operation, transistor 32 is normally conductive from its collector 33 to its emitter 35. When the transistor is conductive, little or no voltage appears at the output of the transistor as seen at collector 33 because of the low impedance of the transistor relative to resistor 39. However, when the object upon which the switch is mounted attains the predetermined threshold acceleration, switch contact 18 contacts switch contact 14 thereby closing switch 12. When switch 12 is closed, current flows from the supply voltage $+V$ through resistor 37, through wire 31, conductor 28, spacer 26, contact 18, contact 14, wire 30, and then to ground. When contacts 14 and 18 are closed, the base terminal of transistor 32 is short-circuited thereby resulting in $V_{EB} \cong 0$ and rendering the transistor non-conductive. When transistor 32 is non-conductive, its impedance becomes extremely high relative to resistor 39 and results in an output voltage $+V$ at its collector 33. The presence of this higher output voltage on the collector 33 can be sensed by various low level logic gates, for example, DTL (diode transistor logic) or TTL (transistor transistor logic) transistor gates or C/MOS (complementary metal oxide semiconductor) gates.

Figure 3:
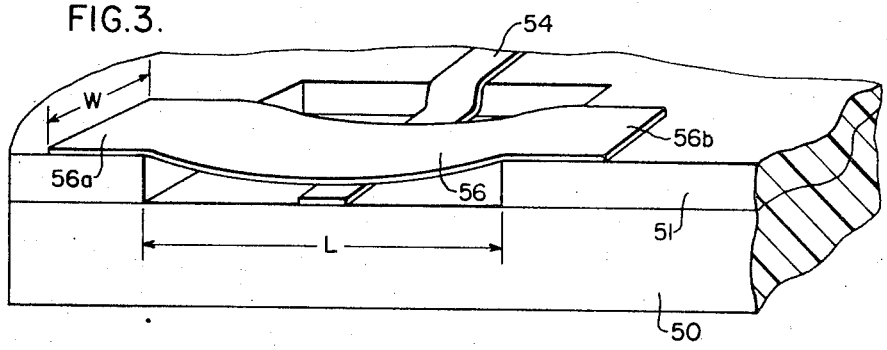
FIG. 3 shows another embodiment of the switch.

An alternative embodiment of the switch is shown in FIG. 3. The structure of the switch as shown in FIG. 3 is basically the same as the switch shown in FIG. 1. The major difference is that the movable conductor is fabricated from a beam which is clamped at both ends rather than just at one end.

The switch assembly in FIG. 3 includes a support base 50 which may be fabricated of an insulator as discussed before. On top of the support base 50 is a layer of silicon dioxide 51. The silicon support base 50 supports the lower stationary contact 54.

Movable contact 56 is mounted upon the layer of silicon dioxide. Movable contact 56 has extremities 56a and 56b. Each of these extremities are secured to the layer of silicon dioxide. The distance between the center of movable contact 56 and stationary contact 54 depends upon the threshold acceleration which is to be indicated. The spacing can be calculated according to the equation:

$$y = \frac{\rho L^4}{32 d^2 E} \left[ 1 + \frac{a(t) \text{ threshold}}{g} \right] \quad (7)$$

The thickness of the layer of silicon dioxide is determined by the spacing which is required between the two beams.

Of course, the same problems which existed with respect to the cantilever configuration are present here.

To repeat, the other considerations were: electrostatic effects, pull-in voltage, dielectric breakdown of air, thickness of beam 56, resonant frequency, the length of the beam L, and the spacing between the beams. As was the case in the cantilever embodiment, both beams are fabricated from gold, as are in the terminal wires (not shown) which are used to connect the switch contacts to the transistor.

In order to provide an indication of when the switch shown in FIG. 3 is actuated, a transistor is connected to the two beams in a manner which is substantially similar to the manner shown in FIG. 2.

Figure 5A:
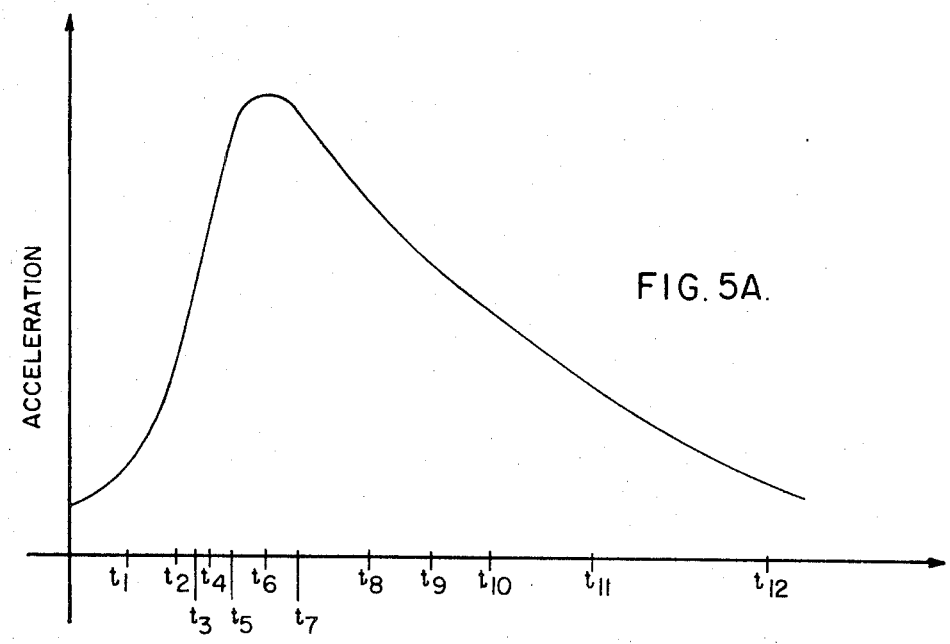
FIG. 5 shows a typical acceleration profile and graphically shows the sequential switching necessary to obtain it.

Many times, it may be desirable to plot a graph showing how a particular object accelerates and then decelerates. Such a plot is called an acceleration profile. A typical acceleration profile is shown in FIG. 5A. As seen in FIG. 5A, the acceleration profile is merely a plot of acceleration versus time.

Figure 4:
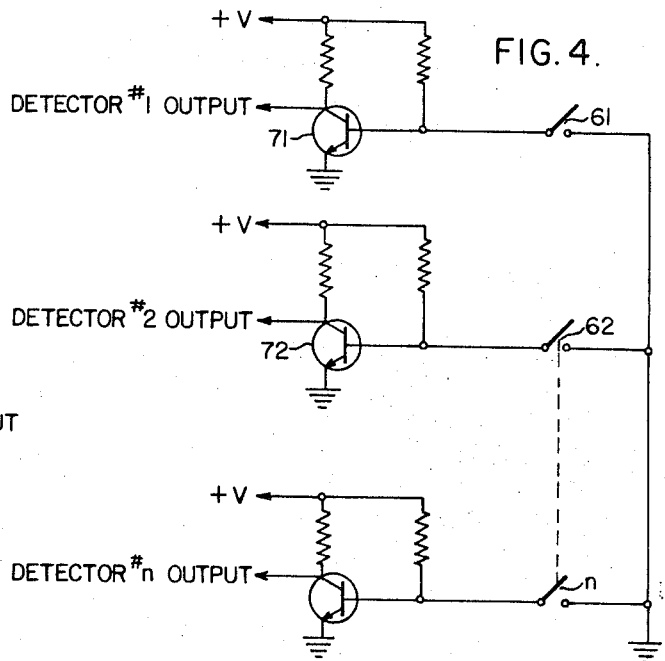
FIG. 4 shows a schematic representation of how a plurality of switches and transistors are connected together to measure the acceleration profile of an object.

FIG. 4 shows a circuit which is usable for obtaining an acceleration profile. FIG. 4 shows a plurality of detector circuits numbered from 1 to $n$. Each of the detector circuits comprises a switch assembly and a transistor circuit for indicating actuation of its switch. The switches may be either of the cantilever type as described in FIG. 1 or the double-end clamped type as shown in FIG. 3. The length of each of the movable beams will be different in order to sense the different accelerations.

In order to explain the operation of FIG. 4, it may be assumed that a plurality of the detectors are connected, as shown, on an artillary shell. When the shell is fired, its acceleration will build up to a point where switch 61 will be closed. Switch 61 will close at time $t_1$ resulting in a signal at the output of transistor 71 as shown by curve 1 in FIG. 5B. As can be seen from curve 1 in FIG. 5B, switch 61 will remain closed until the acceleration of the shell decreases below the threshold acceleration at which time the switch will reopen thereby placing transistor 71 into conduction and causing its output voltage to be reduced to its original value. Again, referring to curve 1 in FIG. 5B, it can be seen that switch 61 will reopen at time $t_{12}$.

Figure 5B:
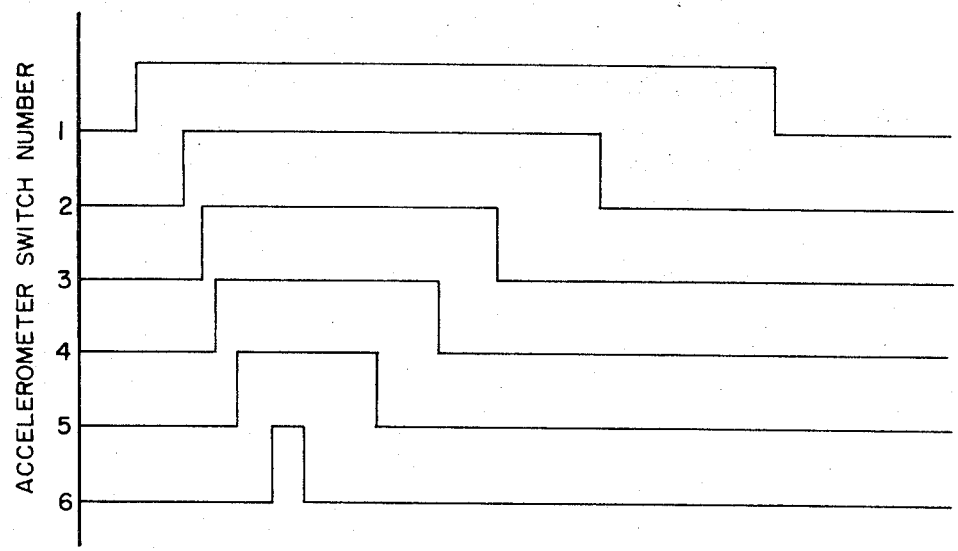

As the artillery shell continues to increase in acceleration, switch 62 will close at time $t_2$ as shown in curve 2 in FIG. 5B. When switch 62 is closed, transistor 72 will provide a greater output voltage as shown at time $t_2$. Switch 62 will remain closed until the acceleration of the artillery shell decreases below its threshold value. This is shown at time $t_{11}$ in curve 2 in FIG. 5B.

In like manner, all of the switches which are mounted on the artillery shell will close in a sequential manner as the shell continues to accelerate. The effect of these switch closings can readily be seen by reference to FIGS. 5A and 5B.

Of course, the use of such a plurality of detectors, is not limited to measuring the acceleration profile of an artillery shell. As noted above, a plurality of detectors could be used on a turbine or a generator to measure the rotational or centrifugal acceleration forces. It could likewise be used on an automobile undergoing crash tests in order to determine the effects on an automobile due to an accident.

What has been described, then, is an accelerometer which can detect and indicate when a particular threshold acceleration has been reached. A plurality of the threshold detectors can be used in order to obtain a continuous readout of changes, both increasing and decreasing, in acceleration.

What we claim is:

1. Apparatus for indicating when an object is subjected to a predetermined acceleration comprising, a switch disposed on said object, said switch having first and second contacts, the dimensions of said contacts and their spacing being such that they are closable only when said object is subjected to said predetermined acceleration and wherein for given first and second contacts said predetermined acceleration is a function only of their said spacing; and an electronically controllable switching means connected to said contacts, the conductivity of said electronically controllable switching means being controlled by said switch contacts.

2. The apparatus of claim 1 including means for connecting said electronically controllable switching means to a source of voltage, said electronically controllable switching means being conductive when said switch contacts are in a first state and nonconductive when said switch contacts are in a second state.

3. The apparatus of claim 2 wherein said first state of said contacts is when said contacts are open and said second state of said contacts is when said contacts are closed.

4. The apparatus of claim 2 wherein said electronically controllable switching means is a transistor and wherein said switch contacts are connected to two of the terminals of said transistor.

5. The apparatus of claim 1 wherein said switch includes a support means, said first contact includes a stationary conductive member, said stationary conductive member resting on said support means; said second contact includes a movable conductive member, said movable conductive member having first and second extremities, said movable conductive member being arranged in such a way that said second extremity is disposed a predetermined distance away from said stationary conductive member when said object is stationary and said second extremity closes to contact said stationary conductive member only when said object is subjected to said predetermined acceleration.

6. The apparatus of claim 4 including means for connecting said contacts to said electronically controllable switching means, said connecting means and said contacts being fabricated from substantially the same material.

7. The apparatus of claim 1 wherein said switch includes a support means, said first contact includes a stationary conductive member, said stationary conductive member resting on said support means; said second contact including a movable conductive member having first and second extremities; each of said extremities resting on said support means, the portion of said movable conductive member which is between said extremities being in a substantially fixed relation to said stationary conductive member when said object is stationary and said portion closes to contact said stationary conductive member only when said object is subjected to said predetermined acceleration.

8. The apparatus of claim 7 wherein said stationary conductive member and said movable conductive member are fabricated from substantially the same material.

* * * * *